United States Patent [19]
Yang

[11] Patent Number: 5,388,883
[45] Date of Patent: Feb. 14, 1995

[54] SUN SHIELD COVER

[76] Inventor: Shyue-Jong A. Yang, 77 Rainbow Ridge Rd., Pomona, Calif. 91766

[21] Appl. No.: 154,614

[22] Filed: Nov. 18, 1993

[51] Int. Cl.6 .............................................. B60J 11/00
[52] U.S. Cl. .................................. 296/136; 296/95.1; 150/166
[58] Field of Search ................. 296/95.1, 136; 135/88, 135/98; 160/370.2; 150/166, 168

[56] References Cited

U.S. PATENT DOCUMENTS

| | | | |
|---|---|---|---|
| 3,992,053 | 11/1976 | Hrytzak et al. | 296/136 X |
| 4,184,501 | 1/1980 | Johnson | 135/88 |
| 4,684,165 | 8/1987 | Becker | 296/136 |
| 4,805,654 | 2/1989 | Wang | 296/136 X |
| 4,825,889 | 5/1989 | Monteith | 296/136 X |
| 4,889,171 | 12/1989 | Minimo | 296/95.1 X |
| 4,998,768 | 3/1991 | Wu | 296/136 |
| 5,040,557 | 8/1991 | Morgan | 296/136 X |
| 5,087,092 | 2/1992 | Antopolsky et al. | 296/95.1 |
| 5,161,849 | 11/1992 | Holland, Jr. | 296/136 X |

FOREIGN PATENT DOCUMENTS

| | | | |
|---|---|---|---|
| 1365238 | 12/1964 | France | 296/136 |
| 60422 | 3/1989 | Japan | 296/136 |
| 2112638 | 7/1983 | United Kingdom | 135/88 |

*Primary Examiner*—Dean J. Kramer

[57] ABSTRACT

A sun shield cover for the vehicle and the like is formed from a round-shaped and lightweight plastic sheet with an apron around the side. An elastic wire is sewn around to support the round shape. After one pushes the round shape into an oval one, two non-elastic plastic belts are used to keep the oval shape. An thin elastic wire is used to raise the central part of the oval-shaped shield to an umbrella shape. Two ear-shaped belts on the side of the shield are connected to the elastic fixing belt to fix the whole shield onto the top of the vehicle.

1 Claim, 7 Drawing Sheets

SUN SHIELD COVER

BACKGROUND OF THE INVENTION

1. Field of the Invention

The present invention relates to a sun shield cover to keep temperature low inside a vehicle. The shield has an umbrella and an oval shape when assembled. It covers the passengers compartment only, not the entire top surface of the vehicle. It also allows the air to flow through the shield to get the best results in low temperatures.

2. Description of the Prior Art

Previous patents which describe sun shield covers are:

| [A] | U.S. Pat. No. 3,992,053 | Hrytzak et al. |
| [B] | U.S. Pat. No. 4,184,501 | Johnson |
| [C] | U.S. Pat. No. 4,684,165 | Becker |
| [D] | U.S. Pat. No. 4,805,654 | Wang |
| [E] | U.S. Pat. No. 4,825,889 | Monteith |
| [F] | U.S. Pat. No. 4,889,171 | Minimo |
| [G] | U.S. Pat. No. 4,998,768 | Wu |
| [H] | U.S. Pat. No. 5,040,557 | Morgan |
| [I] | U.S. Pat. No. 5,087092 | Antopolsky et al. |
| [J] | U.S. Pat. No. 5,161,849 | Holland, Jr. |
| [L] | France Pat. No. 1.365.238 | Guinart |
| [M] | U.K. Pat. No. 2112638 | Lee |
| [N] | Japan Pat. No. JA 0060422 | Hiroyukiito et al. |

None of the prior patents show an inherent-security feature. Some of them need an extra lock or frames to fix on the car. Some did not mention how to prevent theft. Most of the prior references need frames to sustain the shield. This would cause many hassles for the manufacturing and assembling. The rest of the patents which do not have frames either do not have a side-windows covering or no heat prevention function because they are just another type of car cover.

SUMMARY

Accordingly, it is the object of the present invention to provide a sun shield which can prevent high temperatures from building up inside the vehicle, and it will be very easy to use. This sun shield comprises of a round, flexible, two-layered, and lightweight plastic sheet with elastic wire sewing around, which is pulled into the oval shape by two non-elastic belts. Its center is raised by one elastic wire as an umbrella shape, which allows air flow inside. The warm air can easily flow out through the holes on three strips which are on the shield. There are two ear-shaped belts connected to the main elastic belt, which fixes the whole shield on the vehicle.

BRIEF DESCRIPTION OF THE DRAWING(S)

The objects and features of the present invention will become apparent from the following:

Figure 4A:
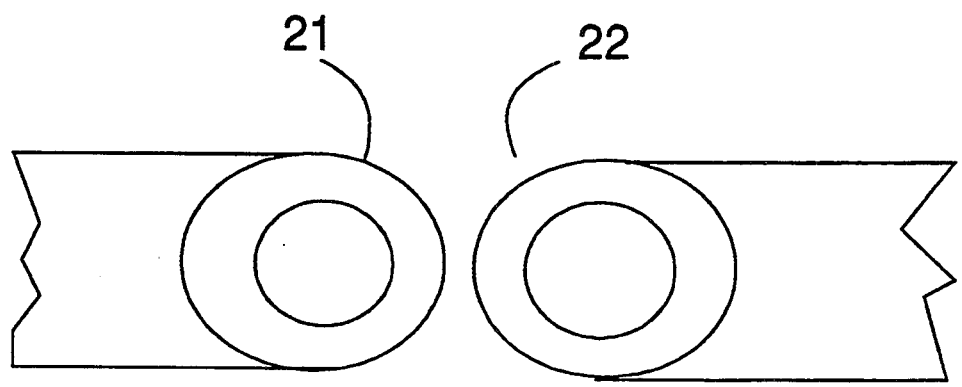
Figure 4A:
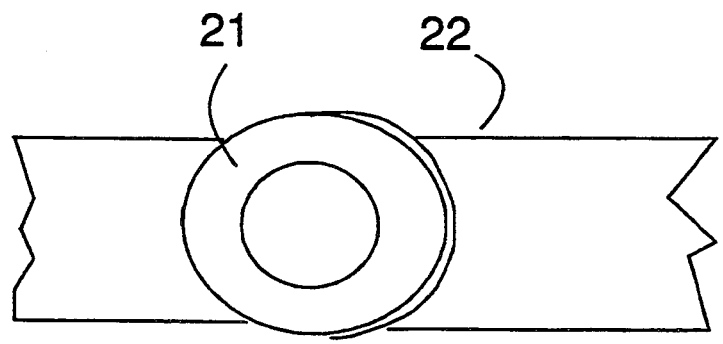
Figure 4B:
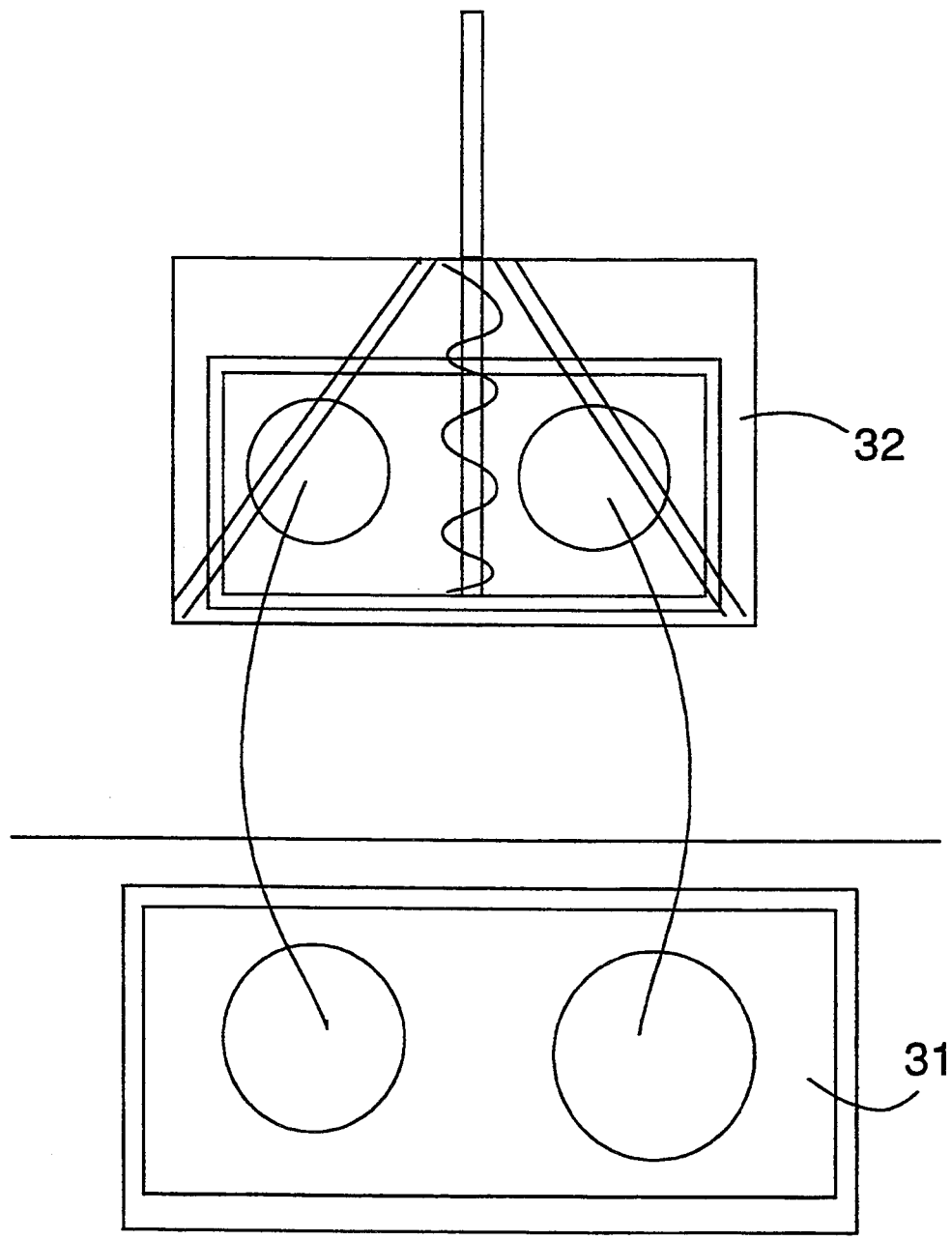
Figure 4C:
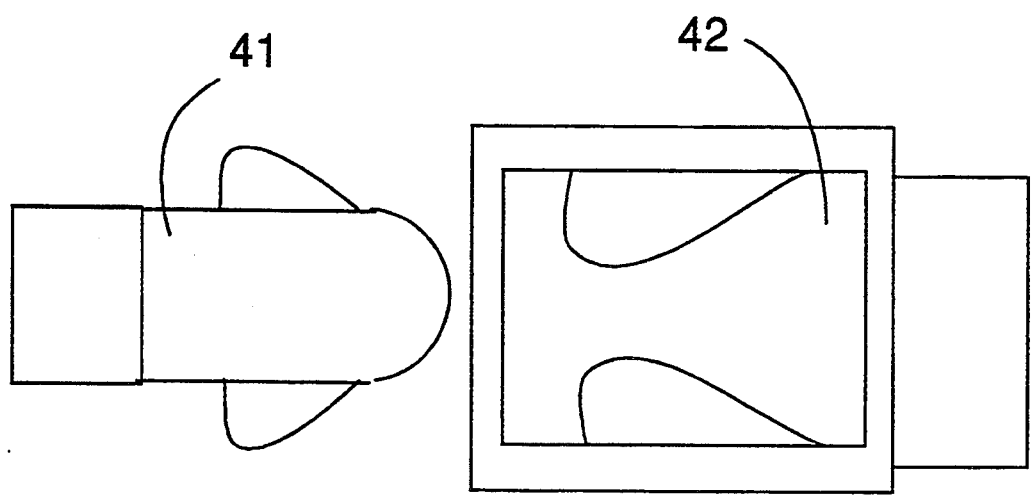
Figure 4C:
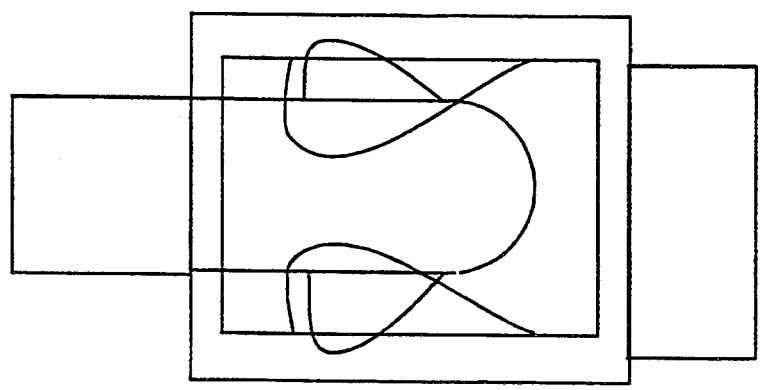

FIGS. 4A–4C has three separate pages, which show all connectors are press-on buttons or click-in buckles.

Figure 5:
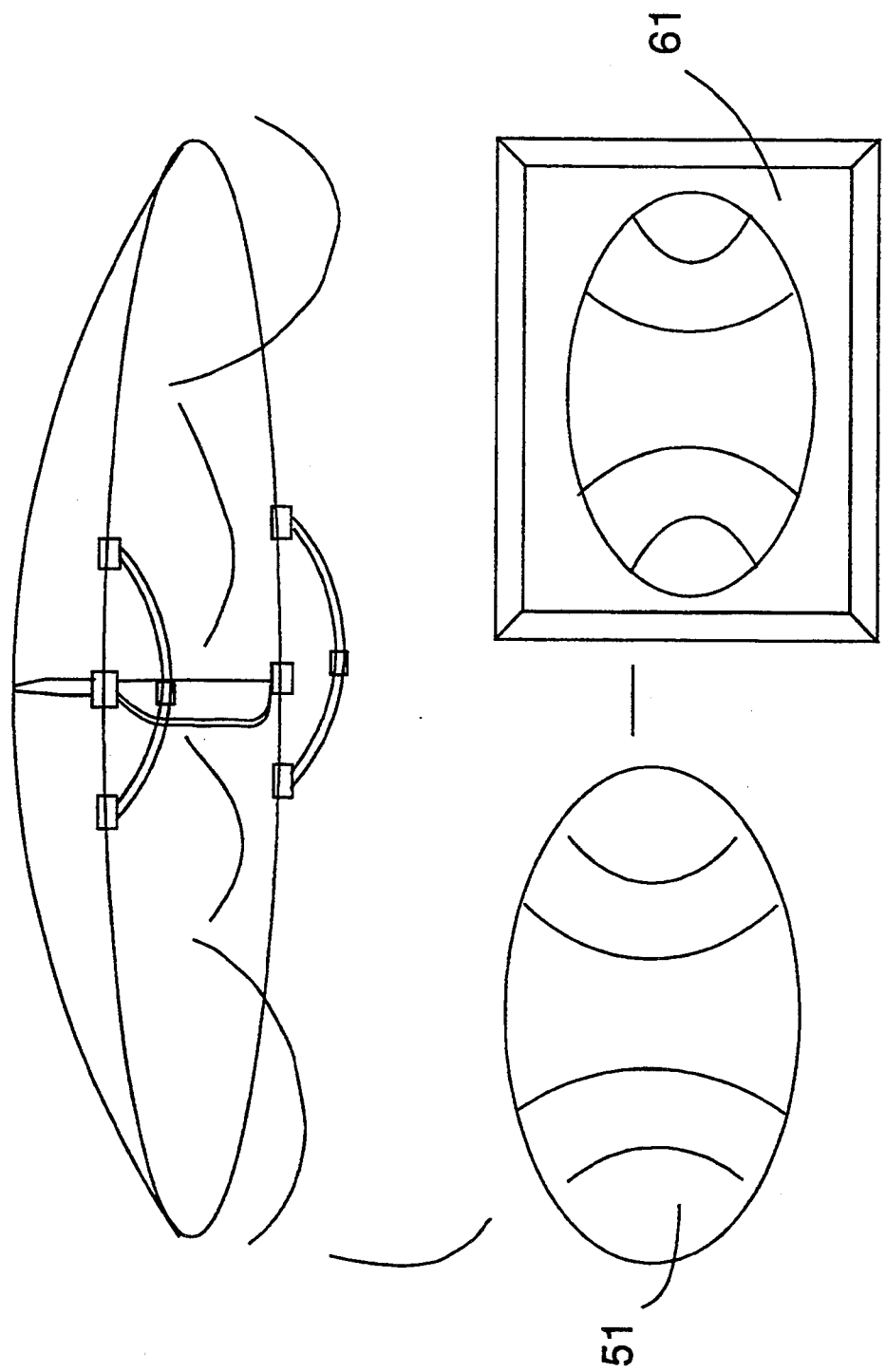

FIG. 5 shows the sun shield can be folded into a football-shaped package without disassembling.

DESCRIPTION OF THE PREFERRED EMBODIMENT

Figure 1:
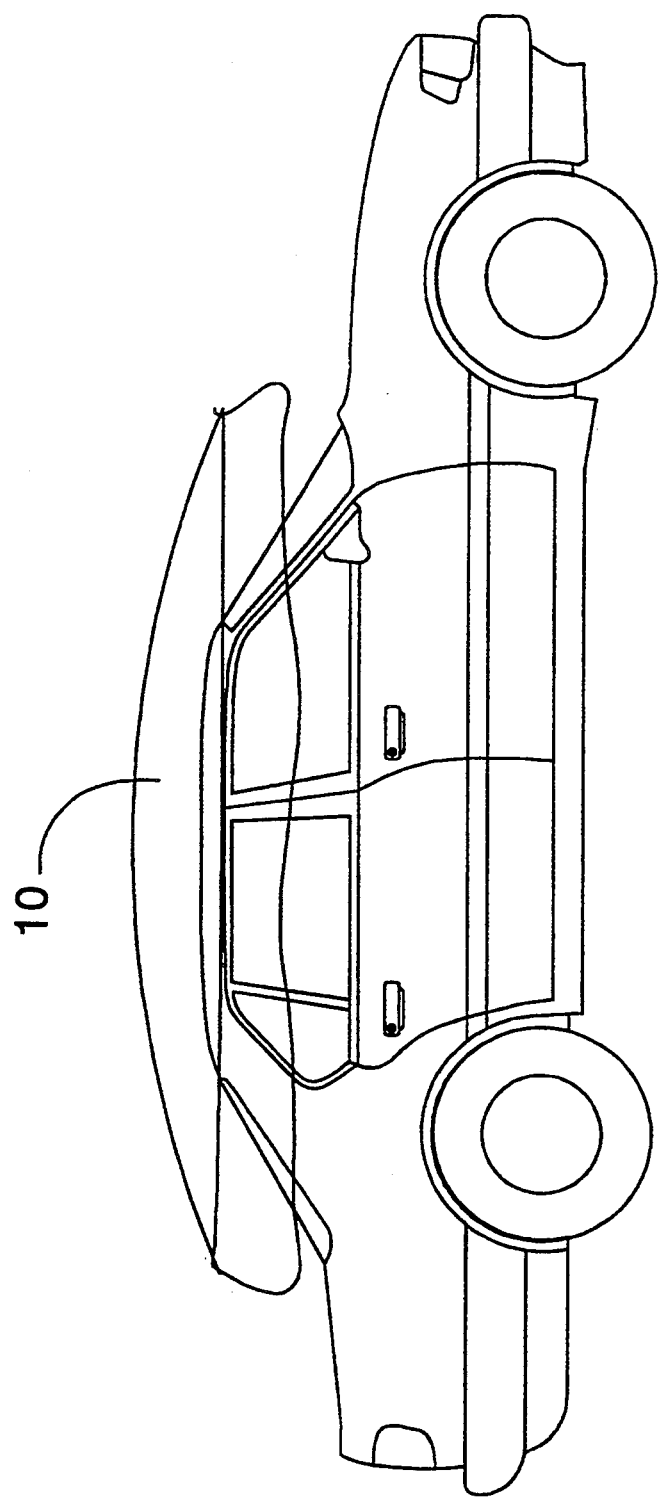
FIG. 1 is the whole view of a sun shield on the top of the vehicle. It has an umbrella shape with an apron around the shield to provide the best effect for blocking the sunlight out.
Figure 2:
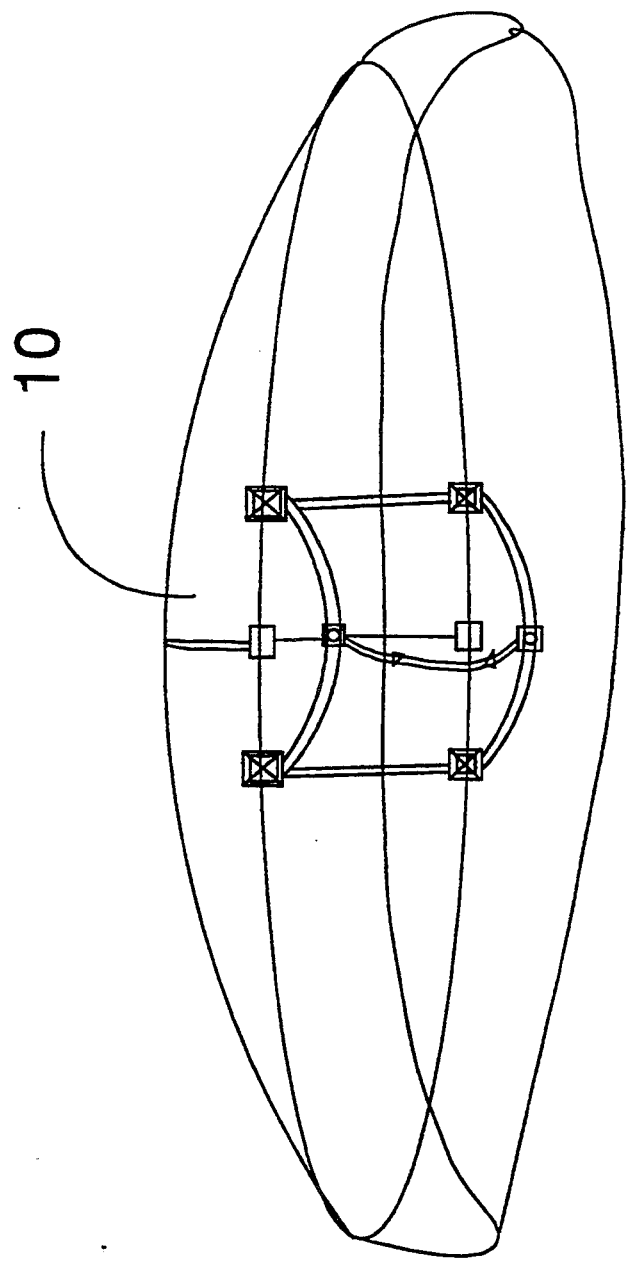
FIG. 2 is the drawing of the assembled sun shield.
Figure 3:
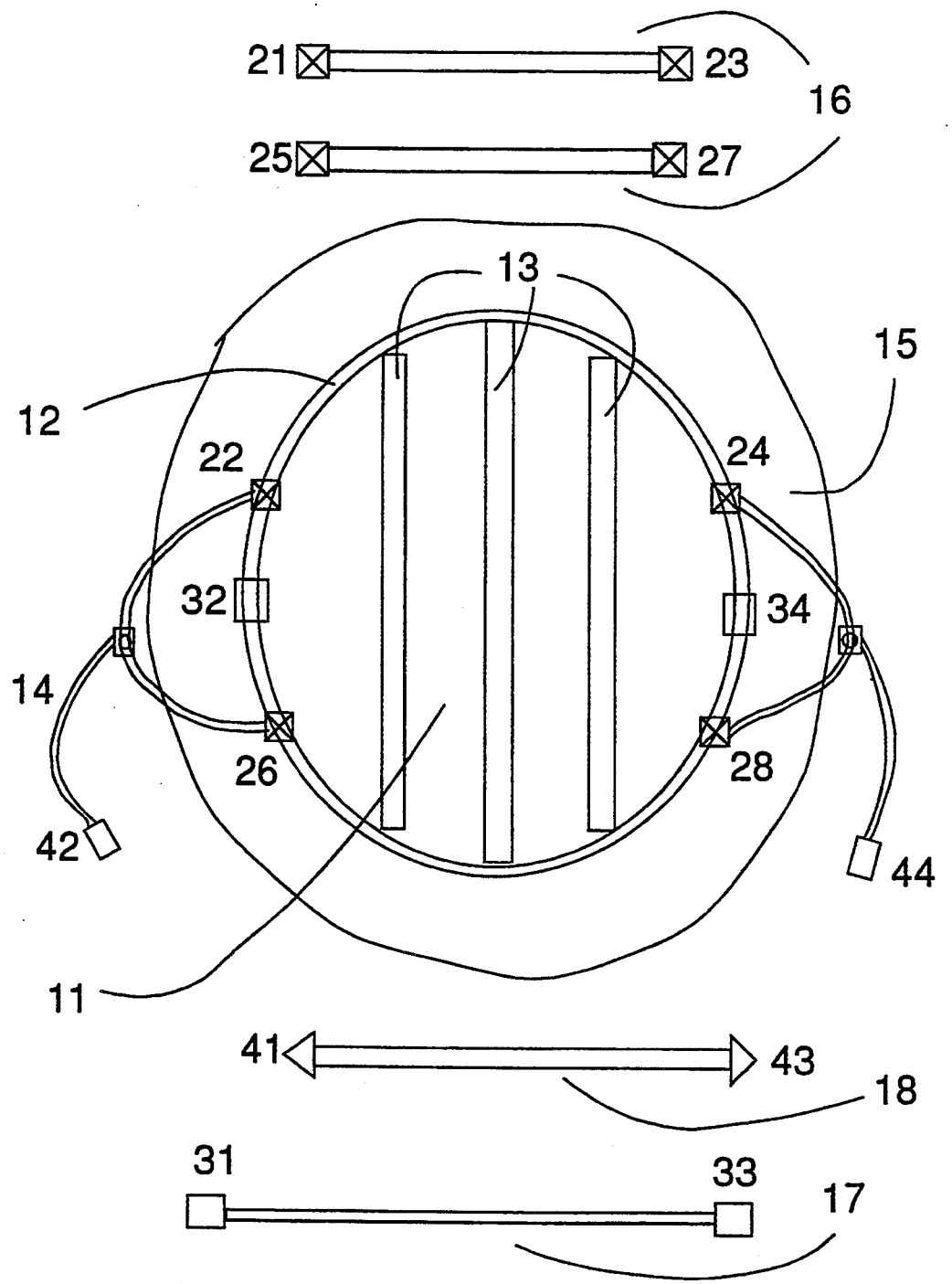
FIG. 3 is the drawing of individual parts of the sun shield.

Referring to the drawing, the sun shield generally is designated 10 in FIG. 1, and FIG. 2. It covers the passenger compartment of the vehicle. It includes a round covering 11 made of lightweight plastic sheet as shown in FIG. 3. The covering 11 is formed by two layers, the bright-colored layer outside to reflect most sun light and the dark-colored layer inside to absorb the heat. The elastic wire 122 is sewn around the plastic sheet to provide support for the round shape. There are three strips 13 with small holes on them, so that the warm air can flow out easily from the top of the shield to prevent heat accumulation. There are two ear-shaped belts 14 on the side of covering 11. They are connected to the elastic fixing belts 17 to fix the whole shield onto the vehicle. The covering 11 has an apron 15 sewn around to provide the best shielding effect.

After one pushes the round shaped covering 11 into an oval one, the non-elastic plastic belts 16 are used to keep the oval shape, which can cover a maximum of the space on the vehicle with minimum material. They are easily connected on the covering 11 by pressing on the buttons, 21 to 22, 23 to 24, 25 to 26, and 27 to 28. The FIG. 4(A) shows the press-on buttons.

The thin elastic wire 17 is used to raise the central part of oval-shaped shield to an umbrella shape, which provides the best tree-shade effect. As shown in FIG. 4(B), it is connected on the covering 11 by pressing on the buttons 31 to 32 and 33 to 34.

The elastic fixing belt 18 is connected to the ear-shaped belts 14 on both ends of the covering 11 and clicks each other inside the vehicle to fix the whole shield 10 onto the top of the vehicle. As shown in FIG. 4(C), they are easily connected by clicking the buckles 41 to 42 and 43 to 44. It has another special function—inherent security. Since the final connection is inside the vehicle, the user does not need extra lock or security equipment to prevent the stealing.

After the shield is assembled, the user does not need to disassemble the whole shield between each use. After user releases one click of the elastic fixing belt 41 or 42, he/she just folds the shield into a football-shaped package 51, and store it in a provided plastic bag 61, as FIG. 5 shows. It is ready for use for next time.

I claim:

1. A sun shield cover for use on a vehicle comprising:
   a lightweight plastic sheet with an apron disposed therearound, the sheet having two layers, the outer layer being brightly colored and the inner layer being darkly colored;
   an elastic wire sewn around the periphery of said sheet to provide support for a generally round shape;
   three strips of material each having a plurality of small holes are formed on said sheet for enabling trapped warm air to flow therethrough;
   means for biasing said sun shield into a general oval umbrella shape;
   two ear-shaped belts disposed along opposing sides of said sheet;
   a pair of elastic fixing belts, one attached to each of said ear-shaped belts wherein said fixing belts can be attached to one another inside of said vehicle thereby fixing said sun shield to said vehicle.

* * * * *